United States Patent
Ito et al.

(10) Patent No.: US 7,001,688 B2
(45) Date of Patent: Feb. 21, 2006

(54) SOLID POLYMER TYPE FUEL BATTERY

(75) Inventors: Hideki Ito, Hiroshima-ken (JP);
Toshiro Kobayashi, Hiroshima-ken (JP); Takuya Moriga, Hiroshima-ken (JP); Akihiko Yamada, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 282 days.

(21) Appl. No.: 10/129,133

(22) PCT Filed: Sep. 18, 2001

(86) PCT No.: PCT/JP01/08103

§ 371 (c)(1),
(2), (4) Date: May 16, 2002

(87) PCT Pub. No.: WO02/23655

PCT Pub. Date: Mar. 21, 2002

(65) Prior Publication Data

US 2003/0008200 A1 Jan. 9, 2003

(30) Foreign Application Priority Data

Sep. 18, 2000 (JP) .............................. 2000-282397

(51) Int. Cl.
*H01M 2/14* (2006.01)
(52) U.S. Cl. ............................ 429/39; 429/38; 429/34; 429/30; 429/35; 429/36; 429/40
(58) Field of Classification Search .................. 429/34, 429/30, 38, 39, 40, 35, 36
See application file for complete search history.

(56) References Cited

U.S. PATENT DOCUMENTS

| 5,441,822 A * | 8/1995 | Yamashita et al. ............ 424/34 |
| 6,106,965 A * | 8/2000 | Hirano et al. ................. 429/30 |
| 6,383,556 B1 * | 5/2002 | Lott et al. ..................... 429/30 |
| 6,720,106 B1 * | 4/2004 | Fukuda et al. ................ 429/40 |
| 2003/0104262 A1 * | 6/2003 | Kuroki et al. ................ 429/36 |
| 2004/0096730 A1 * | 5/2004 | Kuroki et al. ................ 429/44 |

FOREIGN PATENT DOCUMENTS

| JP | 62-73570 | 4/1987 |
| JP | 2-226663 | 9/1990 |
| JP | 8-45517 | 2/1996 |
| JP | 9-265992 | 10/1997 |

* cited by examiner

*Primary Examiner*—Laura Weiner
(74) *Attorney, Agent, or Firm*—Oblon, Spivak, McClelland, Maier & Neustadt, P.C.

(57) ABSTRACT

A polymer electrolyte fuel cell comprising a cell having a solid polymer film, separators disposed on both sides of the cell so as to interpose the cell therebetween, and diffusion layers disposed between the cell and the separators and each having a substrate comprising an electrically conductive porous material and a slurry layer disposed on the substrate, wherein at least a part of each diffusion layer is provided with a gas barrier for preventing the permeation of gas in a direction parallel to the major surface of the diffusion layer.

19 Claims, 6 Drawing Sheets

F I G. 4(a)
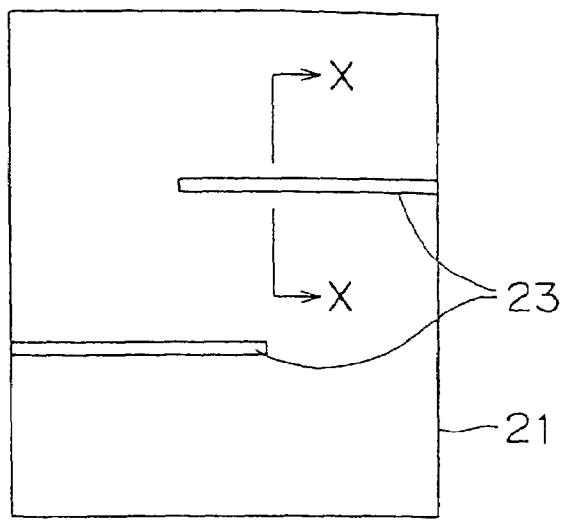
F I G. 4(b)
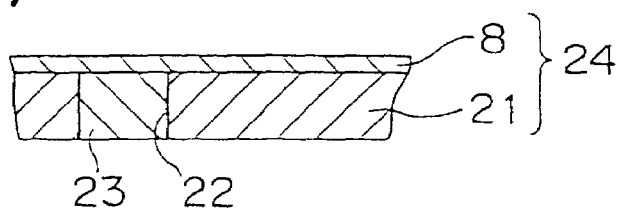
F I G. 5
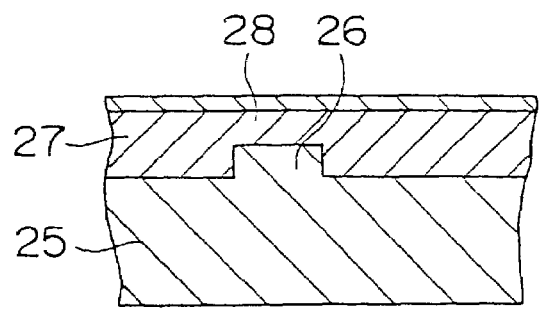
F I G. 6
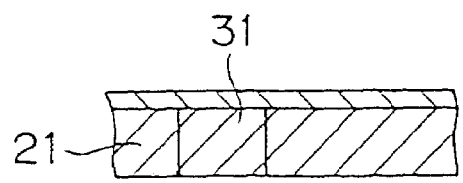

SOLID POLYMER TYPE FUEL BATTERY

TECHNICAL FIELD

This invention relates to improvements in polymer electrolyte fuel cells (PEFCs).

BACKGROUND ART

Conventionally, a polymer electrolyte fuel cell is made up of a cell, two separators disposed on both sides of this cell so as to interpose the cell therebetween, and diffusion layers disposed between the aforesaid cell and the separators.

The aforesaid cell consists of a solid polymer film and two reaction layers disposed on both sides of the film. Each of the aforesaid diffusion layers consists of carbon paper and a slurry layer formed on one major surface thereof. A groove for the passage of hydrogen gas is formed in the surface of one separator facing the cell, and a groove for the passage of air is formed in the other separator.

However, conventional separators for use in polymer electrolyte fuel cells have a problem in that the fuel gas and the oxidant gas do not flow in conformity with the shape of the groove but bypass it by flowing through the aforesaid diffusion layers, so that water is retained in the cell to cause a corresponding reduction in reaction area, a deterioration in electricity generation performance, and a risk of damage to the cell.

Meanwhile, in order to remove the water retained in the cell, there has been employed a method in which the pressure loss in the separators is sufficiently increased to introduce the retained water into the gases as water vapor. However, this method is advantageous in that the gas pressure losses in the polymer electrolyte fuel cell are increased to cause an increase in power consumption by auxiliary devices such as compressors for feeding the gases, resulting in a reduction in electricity generation efficiency of the whole fuel cell system.

DISCLOSURE OF THE INVENTION

The present invention has been made in view of these circumstances, and an object thereof is to provide a polymer electrolyte fuel cell in which at least a part of each diffusion layer is provided with a gas barrier for preventing the permeation of gas in a direction parallel to the major surface of the diffusion layer, so that the retention of water in the cell can be avoided, uniform electricity generation can be achieved over the whole surface of the cell, and water can be removed efficiently.

According to the present invention, there is provided a polymer electrolyte fuel cell comprising a cell having a solid polymer film, separators disposed on both sides of the cell so as to interpose the cell therebetween, and diffusion layers disposed between the cell and the separators and each having a substrate comprising an electrically conductive porous material and a slurry layer disposed on the substrate, wherein at least a part of each diffusion layer is provided with a gas barrier for preventing the permeation of gas in a direction parallel to the major surface of the diffusion layer.

In a preferred embodiment of the present invention, the gas barrier comprises a gas-impervious material layer formed by removing the material of the substrate from the part thereof intended for the formation of a gas barrier and filling the resulting vacant space with rubber or resin.

Moreover, in a preferred embodiment of the present invention, the gas barrier comprises a projecting part of each separator which is formed in the part thereof intended for the formation of a gas barrier so as to have a greater thickness than its surroundings, and a compressed layer formed by compressing the part of the electrically conductive porous material corresponding to the projecting part as compared with its surroundings.

Moreover, in a preferred embodiment of the present invention, the gas barrier comprises a resin-impregnated layer formed by infiltrating resin into the part of each separator which is intended for the formation of a gas barrier and thereby imparting gas tightness thereto.

Moreover, in a preferred embodiment of the present invention, the substrate comprising an electrically conductive porous material is formed by subjecting carbon paper, carbon cloth or nonwoven carbon fabric to a water-repellent treatment with a fluororesin.

Moreover, in a preferred embodiment of the present invention, the surface energy of the diffusion layers is in the range of $1\times10^{-3}$ to $5\times10^{-2}$ N/M.

Moreover, in a preferred embodiment of the present invention, the flow rate, $L_A$ [l/min], of the fuel gas fed and the pressure loss, $\Delta P_A$ [MPa], satisfy the condition defined by $\Delta P_A \leq 0.002 \times L_A$, and the flow rate, $L_C$ [l/min], of the oxidant gas fed and the pressure loss, $\Delta P_C$[Mpa], satisfy the condition defined by $\Delta P_A \leq 0.002 \times L_C$.

Furthermore, in a preferred embodiment of the present invention, the gas permeability rate of the diffusion layers is not less than $1.5\times10^{-4}$ cm/s/Pa.

Furthermore, in a preferred embodiment of the present invention, the average porosity of the diffusion layers is not less than 45%.

BRIEF DESCRIPTION OF THE DRAWINGS

FIG. 4 is a schematic cross-sectional view of a PEFC in accordance with a first embodiment of the present invention;

FIG. 5 is a schematic cross-sectional view of a PEFC in accordance with a second embodiment of the present invention;

FIG. 6 is a schematic cross-sectional view of a PEFC in accordance with a third embodiment of the present invention;

BEST MODE FOR CARRYING OUT THE INVENTION

Several embodiments of the present invention will be described hereinbelow with reference to the accompanying drawings. However, these embodiments are not to be construed to limit the technical scope of the present invention.

First of all, a polymer electrolyte fuel cell (PEFC) in accordance with one embodiment of the present invention is described with reference to the accompanying drawings.

First Embodiment

Figure 1:
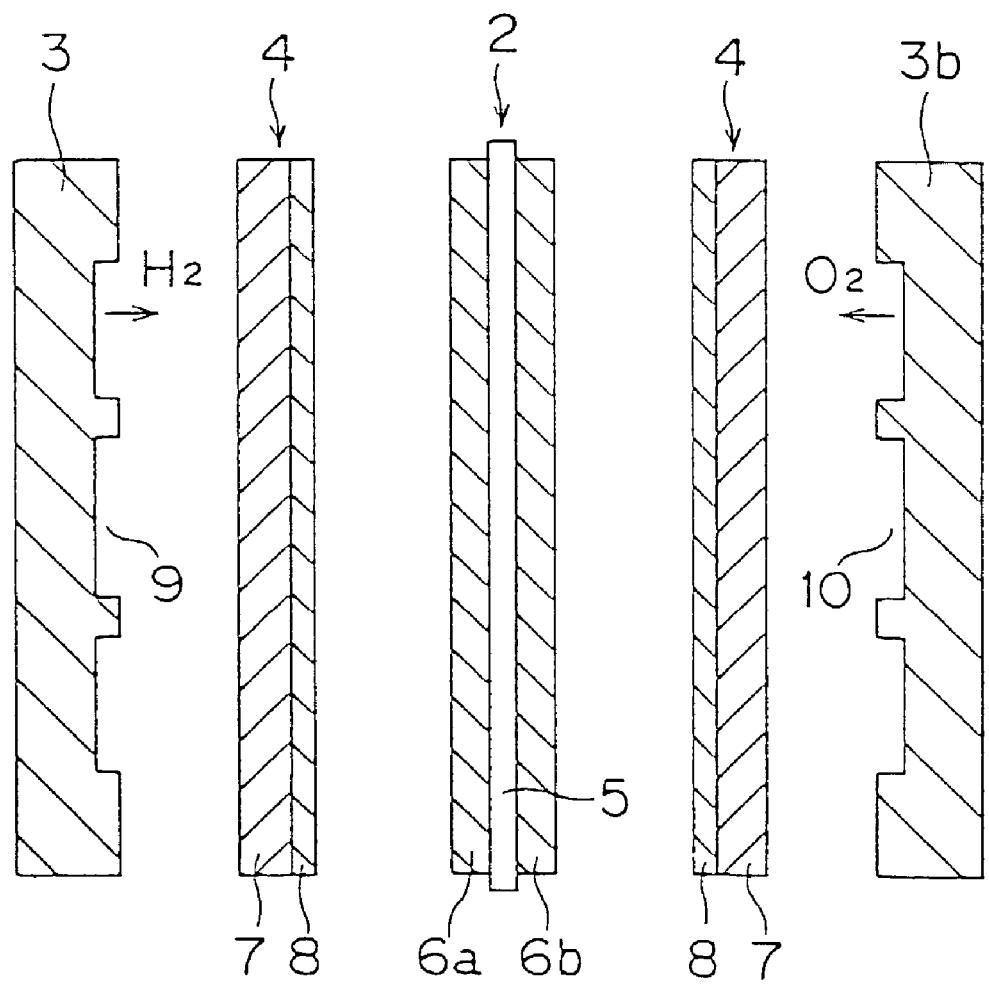
FIG. 1 is an exploded cross-sectional view for the brief explanation of a PEFC in accordance with the present invention.

FIG. 1 is an exploded cross-sectional view illustrating one embodiment of a polymer electrolyte fuel cell in accordance with the present invention. This fuel cell 1 is made up of a cell 2, separators 3a, 3b disposed on both sides of this cell 2 so as to interpose cell 2 therebetween, and diffusion layers 4 disposed between the aforesaid cell 2 and separators 3a, 3b.

The aforesaid cell 2 consists of a solid polymer film 5 and reaction layers 6a, 6b disposed on both sides of film 5.

Solid polymer film 5 is a film formed, for example, of a perfluorosulfonic acid.

Each of the aforesaid diffusion layers 4 consists of carbon paper 7 which is also called a substrate, and a slurry layer 8 formed on one major surface thereof. This carbon paper may be replaced by another electrically conductive porous material such as carbon cloth or nonwoven carbon fabric. Slurry layer 8 may be formed, for example, by mixing hydrophilic carbon black, hydrophobic carbon black and polytetrafluoroethylene in solvent naphtha to prepare a slurry, screen-printing the slurry on a surface of the diffusion layer, and firing it.

On the other hand, a groove 9 for the passage of hydrogen gas is formed in the surface of one separator 3a facing the cell. A groove 10 for the passage of air is formed in the other separator 3b.

Figure 2:
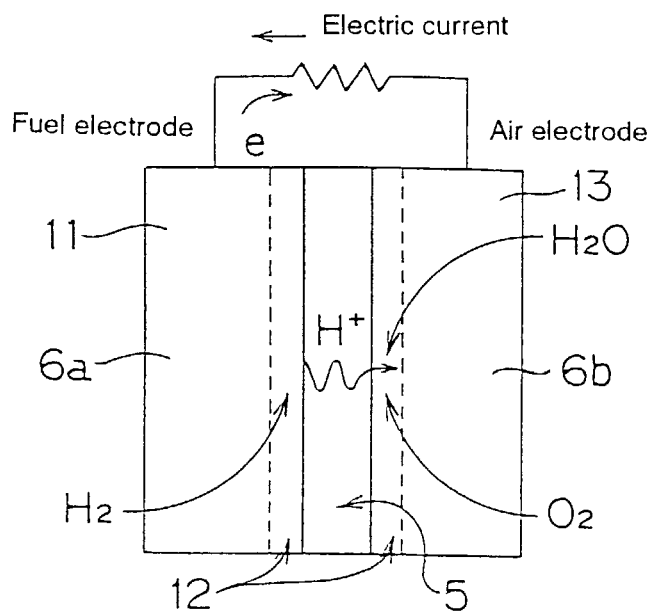
FIG. 2 is a schematic view illustrating the reaction behavior of the cell constituting the PEFC of FIG. 1.

Now, the aforesaid cell 2 is more specifically explained. As illustrated in FIG. 2, one reaction layer 6a consists of a fuel electrode 11 and, for example, a platinum catalyst layer 12 formed on the side thereof adjacent to solid polymer film 5, and the other reaction layer 6b consists of an air electrode 13 and a platinum catalyst layer 12 formed on the side thereof adjacent to solid polymer film 5. Fuel electrode 11 is formed of a platinum alloy catalyst supported on carbon black and a material such as an electrolyte polymer, and air electrolyte 13 is formed of a platinum alloy catalyst supported on carbon black and a material such as an electrolyte polymer.

In the aforesaid fuel electrode 11 and air electrode 13, the following reactions take place.

Fuel electrode: 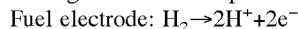
Air electrode: 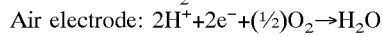

Figure 3:
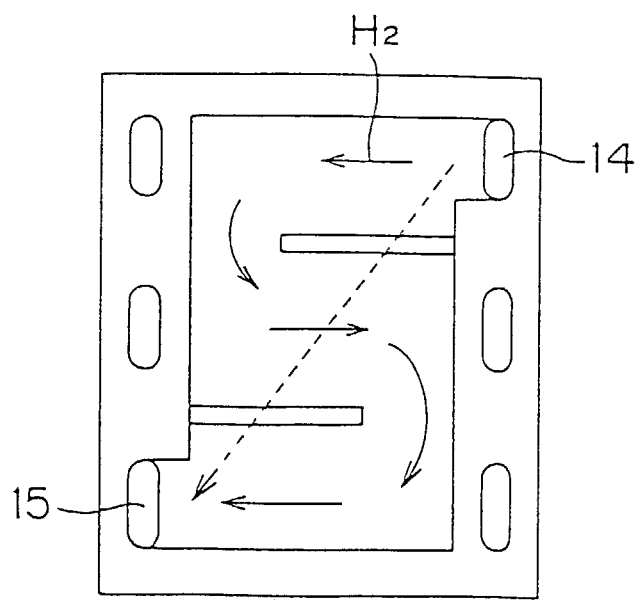
FIG. 3 is a plan view illustrating schematically a separator for use in the PEFC.

In the fuel cell of this construction, the aforesaid separator 3a (or 3b) has a planar configuration in which a serpentine groove is formed as illustrated in FIG. 3. That is, in the separator of this type is configured in such a way that, when hydrogen gas, for example, is conveyed from an entrance hole 14 at a corner of separator 3a to a diagonally opposite discharge hole 15, the direction of gas flow is changed, for example, about three times in order to increase the flow velocity of the gas and thereby blow off any water present in the groove.

In this situation, the fuel gas and the oxidant gas may not flow in conformity with the shape of the groove but bypass it by flowing through the diffusion layer, as shown by the broken line in FIG. 3. This phenomenon should be avoided because water is retained in the cell to cause a corresponding reduction in reaction area and a deterioration in electricity generation performance.

Now, reference is made to FIGS. 4(a) and 4(b). As previously described, FIG. 4(a) is a schematic plan view of a diffusion layer constituting a PEFC (polymer electrolyte fuel cell) in accordance with the first embodiment of the present invention, and FIG. 4(b) is a cross-sectional view taken along line X—X in FIG. 4(a). It is to be understood that the slurry layer is omitted in FIG. 4(a).

In carbon paper 21 constituting the diffusion layer, slits 22 are made along the serpentine groove (not shown) of separator 3a (or 3b). These slits 22 of carbon paper 21 are filled with a gas barrier 23 formed, for example, of rubber.

A slurry layer 8 is formed on carbon paper 21 containing the aforesaid gas barrier 23 to complete diffusion layer 24 together with carbon paper 21. In this case, gas barrier 23 is formed of a room temperature curing silicone rubber sealing material.

In this embodiment, the gas barrier is formed by pouring liquid silicone rubber into the slits made in the carbon paper, adjusting it to a predetermined thickness, and curing it at room temperature.

Thus, according to the first embodiment, carbon paper (substrate) 21 is provided with slits 22 along the serpentine groove (not shown) of separator 3a (or 3b), and these slits are filled with gas barrier 23 formed, for example, of rubber. Consequently, when the separators are attached to the cell and the gases are made to flow meanderingly, the gases can flow along the grooves of the separators without bypassing them. Accordingly, the retention of water in the cell can be prevented and uniform electricity generation can be achieved over the whole surface of the cell. Moreover, a uniform gas flow velocity can be obtained over the whole cell surface and water can be removed efficiently.

Second Embodiment

Now, reference is made to FIG. 5. FIG. 5 is a schematic cross-sectional view of a diffusion layer and a separator which constitute a PEFC in accordance with a second embodiment of the present invention. In this embodiment, separator 25 has a projecting part 26 having a greater thickness than its surroundings. Correspondingly to projecting part 26, carbon paper 27 has a compressed layer (gas barrier) 28 formed so as to be recessed as compared with its surroundings. A slurry layer 8 is formed on the aforesaid carbon paper 27 having the aforesaid compressed layer 28.

Thus, according to the second embodiment, projecting part 26 having a greater thickness than its surroundings is formed at a predetermined position of separator 25, and compressed layer 28 corresponding to this projecting part 27 is formed in carbon paper 27. Consequently, similarly to the first embodiment, the retention of water in the cell can be prevented and uniform electricity generation can be achieved over the whole surface of the cell. Moreover, a uniform gas flow velocity can be obtained over the whole cell surface and water can be removed efficiently.

Third Embodiment

Now, reference is made to FIG. 6. FIG. 6 is a schematic cross-sectional view of a diffusion layer constituting a PEFC in accordance with a third embodiment of the present invention. In this embodiment, a gas barrier comprises a resin-impregnated layer 31 formed by infiltrating a resin into the part of carbon paper (substrate) 21 which is intended for the formation of a gas barrier. This resin-impregnated layer 31 has gas tightness and does not allow gas to pass therethrough. A slurry layer 8 is formed on carbon paper 27 having the aforesaid resin-impregnated layer 31.

Thus, according to the third embodiment, resin-impregnated layer 31 having gas tightness is formed in the part of carbon paper 21 which is intended for the formation of a gas barrier. Consequently, similarly to the first embodiment, the retention of water in the cell can be prevented and uniform electricity generation can be achieved over the whole surface of the cell. Moreover, a uniform gas flow velocity can be obtained over the whole cell surface and water can be removed efficiently.

EXAMINATION OF VARIOUS CONDITIONS ON THE BASIS OF EXAMPLES

With regard to polymer electrolyte fuel cells in accordance with the present invention, the present inventors further examined their appropriate operating conditions and the like on the basis of the following examples and comparative examples.

Examples 1 and 2 and Comparative Examples 1 and 2

In Examples 1 and 2, fuel cells were fabricated by using a diffusion layer provided with a gas barrier comprising silicone polymer on the air electrode side. The number of grooves in the separator was 23 passes in Example 1 and 30 passes in Example 2.

In Comparative Examples 1 and 2, fuel cells were fabricated by using the same diffusion layer, except that the number of grooves in the separator was 10 passes in Comparative Example 1 and 1 pass in Comparative Example 2.

Figure 7:
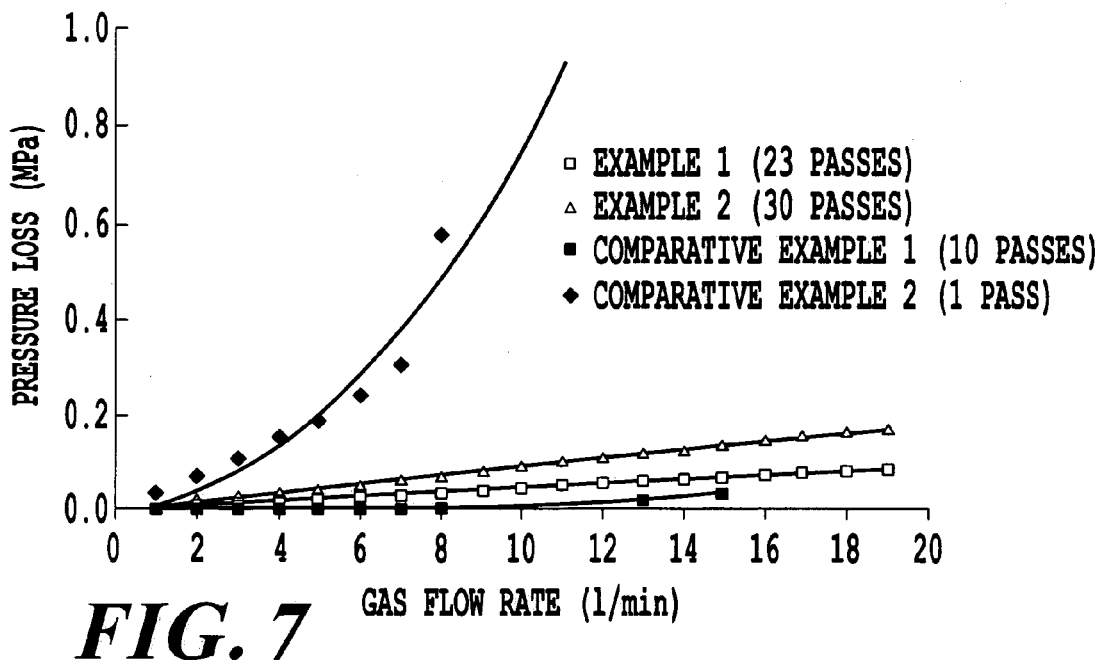
FIG. 7 is a graph showing the relationship between the gas flow rate on the air electrode and the pressure loss.

FIG. 7 is a graph showing the relationship between the gas flow rate and the pressure loss on the air electrode side. A comparison between Comparative Examples 1 and 2 reveals that the pressure loss for a given flow rate increases dramatically by decreasing the number of grooves from 10 passes to 1 pass, and this permits the removal of water.

However, a comparison between Examples 1 and 2 shows no substantial difference in pressure loss according to the number of grooves in the separator. It is believed that, in Examples 1 and 2, the gas barrier formed in the diffusion layer permitted the rectification of the gas.

When Examples 1 and 2 are compared with Comparative Example 2, the pressure loss is lower in Examples 1 and 2. However, it has been confirmed that, owing to the gas-rectifying effect, water is effectively discharged to at least the same extent as in Comparative Example 2. Accordingly, in Examples 1 and 2, electricity generation performance equal to that of Comparative Example 2 can be achieved at lower pressures.

Example 3 and Comparative Examples 3 and 4

In Example 3, a fuel cell was fabricated by using a diffusion layer provided with a gas barrier comprising silicone polymer on the fuel electrode side. The groove depth of the separator was 100% (0.3 mm deep) in Example 3.

In Comparative Examples 3 and 4, fuel cells were fabricated by using the same diffusion layer, except that the groove depth of the separator was 100% in Comparative Example 3 and 50% in Comparative Example 4.

Figure 8:
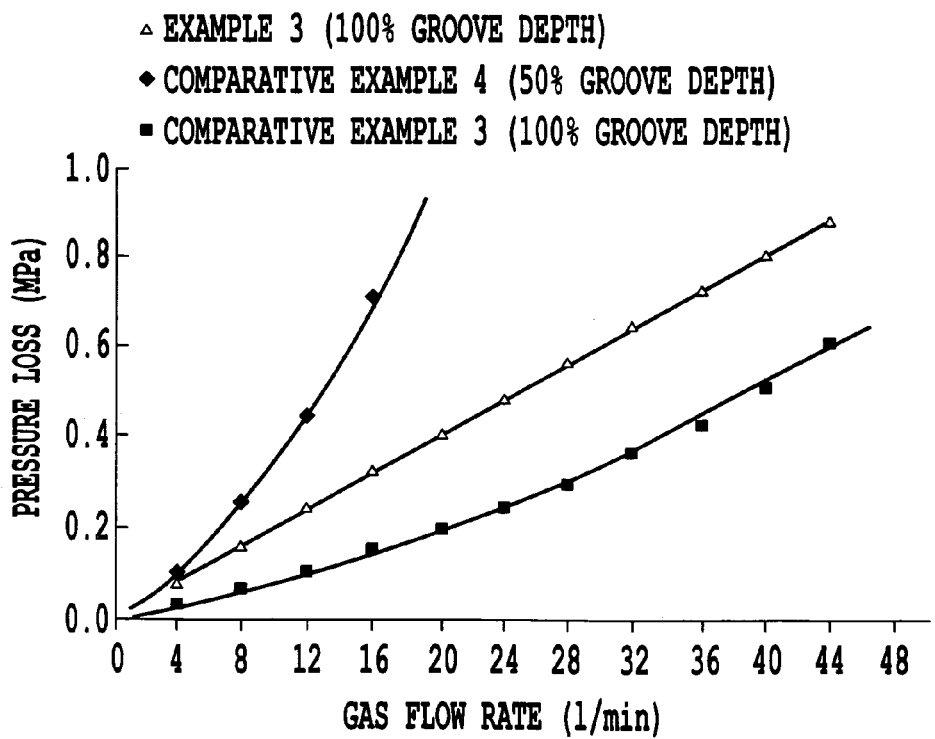
FIG. 8 is a graph showing the relationship between the gas flow rate on the fuel electrode and the pressure loss.

FIG. 8 is a graph showing the relationship between the gas flow rate and the pressure loss on the fuel electrode side.

A comparison between Comparative Examples 3 and 4 reveals that the pressure loss for a given flow rate increases dramatically by decreasing the groove depth from 100% to 50%, and this permits the effective removal of water.

When Example 3 is compared with Comparative Example 3 in FIG. 8, a pressure loss can be obtained without decreasing the groove depth of the separator. The reason for this seems to be that the gas barrier formed in the diffusion layer permitted the rectification of the gas.

When Example 3 is compared with Comparative Example 4, the pressure loss is lower in Example 3. However, it has been confirmed by the actual evaluation of electricity generation performance that the same voltage is produced under the same conditions as in Comparative Example 4 and, therefore, water is discharged effectively. It is believed that this is due to the gas-rectifying effect of the gas barrier. Thus, in Example 3, electricity generation performance equal to that of Comparative Example 4 can be achieved at lower pressures.

Example 4 and Comparative Examples 5 and 6

Figure 9:
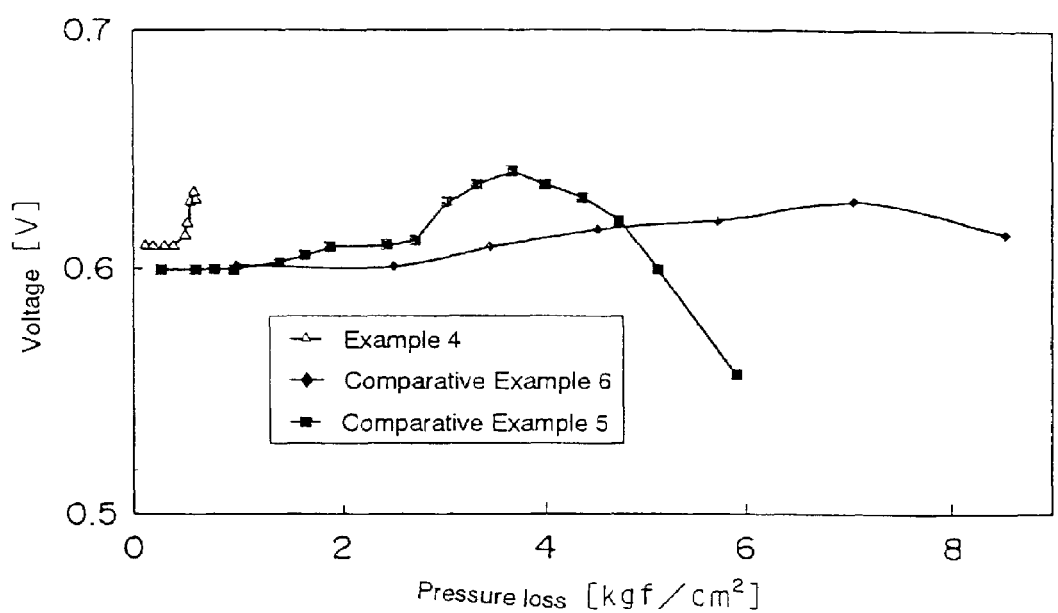
FIG. 9 is a graph showing the relationship between the pressure loss and the produced voltage.

FIG. 9 shows the relationship between the pressure loss (in one-to-one correspondence with the fuel flow rate) on the fuel electrode side and the voltage in each fuel cell.

Fuel cells were fabricated as follows: In Example 4, the construction of Example 1 was employed on the air electrode side and the construction of Example 2 on the fuel electrode side. In Comparative Example 5, the construction of Comparative Example 1 was employed on the air electrode side and the construction of Comparative Example 1 on the fuel electrode side. In Comparative Example 6, the construction of Comparative Example 2 was employed on the air electrode side and the construction of Comparative Example 4 on the fuel electrode side.

In Comparative Example 5 exhibiting a high pressure loss on both the fuel electrode and the air electrode side (in which the groove depth is 50% as compared with Comparative Example 6), a stabilized high voltage can be obtained at relatively low pressure losses. The reasons for this are believed that a pressure loss can be obtained at low gas flow rates and that the small amount of gas causes a decrease of entrained water vapor and hence a decrease of water to be discharged.

In Comparative Example 6 exhibiting a low pressure loss on both the fuel electrode and the air electrode side, a stabilized high voltage cannot be obtained. It can be seen that, in order to obtain a stabilized high voltage, it is necessary to increase the pressure loss and hence feed large amounts of gases.

On the other hand, in Example 4, the highest voltage can be obtained at a much lower gas flow rate than in Comparative Examples 5 and 6. The reasons for this are believed to be that water can be efficiently discharged from the fuel cell owing to the gas-rectifying effect of the gas barrier formed in the diffusion layers and that an inert gas ($N_2$) contained in the fuel gas can be prevented from staying in the fuel cell and, therefore, the hydrogen concentration within the fuel cell can be maintained at an appropriate level.

When a polymer electrolyte fuel cell is provided with a gas barrier in accordance with the present invention, the flow rate ($L_A$ [l/min]) of the fuel gas fed thereto and the pressure loss $\Delta P_A$ [MPa]) in the polymer electrolyte fuel cell can satisfy the condition defined by $\Delta P_A \leq 0.02 \times L_A$. Similarly, the flow rate ($L_C$ [l/min]) of the oxidant gas fed to the polymer electrolyte fuel cell and the pressure loss ($\Delta P_C$ [Mpa]) in the polymer electrolyte fuel cell can satisfy the condition defined by $\Delta P_C \leq 0.001 \times L_C$. Even under these conditions, the retention of water in the cell can preferably be avoided, uniform electricity generation can be achieved over the whole surface of the cell, and water can be removed efficiently.

The condition for the fuel gas flow rate, as defined by $\Delta P_A \leq 0.02 \times L_A$, has been derived from the fact that, on the basis of the results of Example 3 shown in FIG. 8, the limit of the lowest pressure loss permitting operation lies under the straight line of Example 3.

The condition for the oxidant gas flow rate, as defined by $\Delta P_C \leq 0.01 \times L_C$, has been derived from the fact that the limit of the lowest pressure loss permitting operation lies under the straight line of Example 1 in FIG. 7.

Example 5

Figure 10:
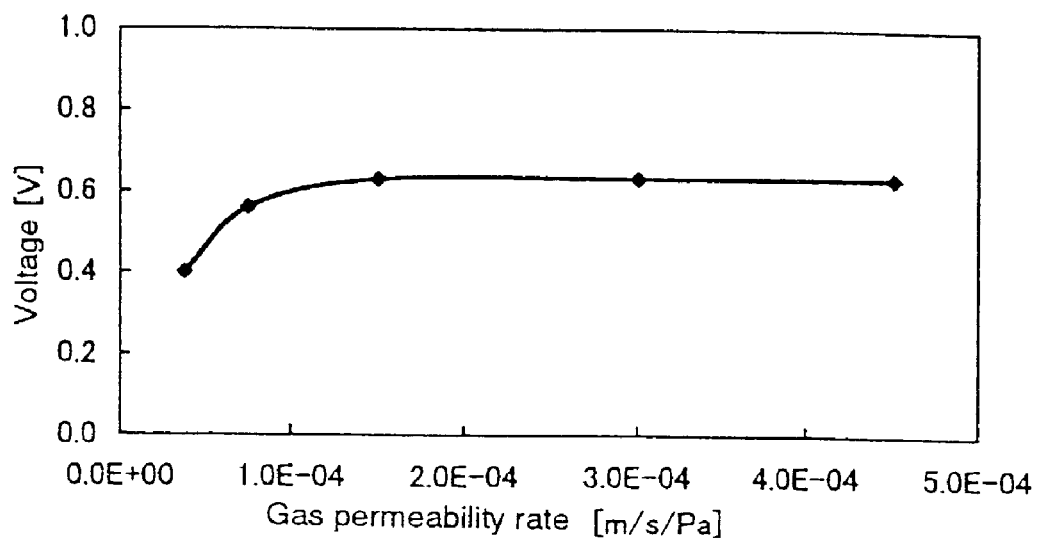
FIG. 10 is a graph showing the relationship between the gas permeability rate of the diffusion layers and the produced voltage.

A slurry layer comprising carbon black and polytetrafluoroethylene was formed on several types of carbon paper having different gas permeability rates. Then, slits were made therein so as to conform to the shape of the groove, and filled with silicone rubber. Electricity generation tests were carried out by using the gas diffusion layers so formed. The relationship between the gas permeability rate of the diffusion layers and the produced voltage is shown in FIG. 10. The produced voltage began to drop when the gas permeability rate was decreased to $1.5 \times 10^{-4}$ m/s/Pa or less. A voltage drop of about 10% was observed at $0.75 \times 10^{-4}$ m/s/Pa, and a voltage drop of 37% at $0.38 \times 10^{-4}$ m/s/Pa. These results indicate that the gas permeability rate of the diffusion layers should preferably be not less than $1.5 \times 10^{-4}$ m/s/Pa.

Example 6

Figure 11:
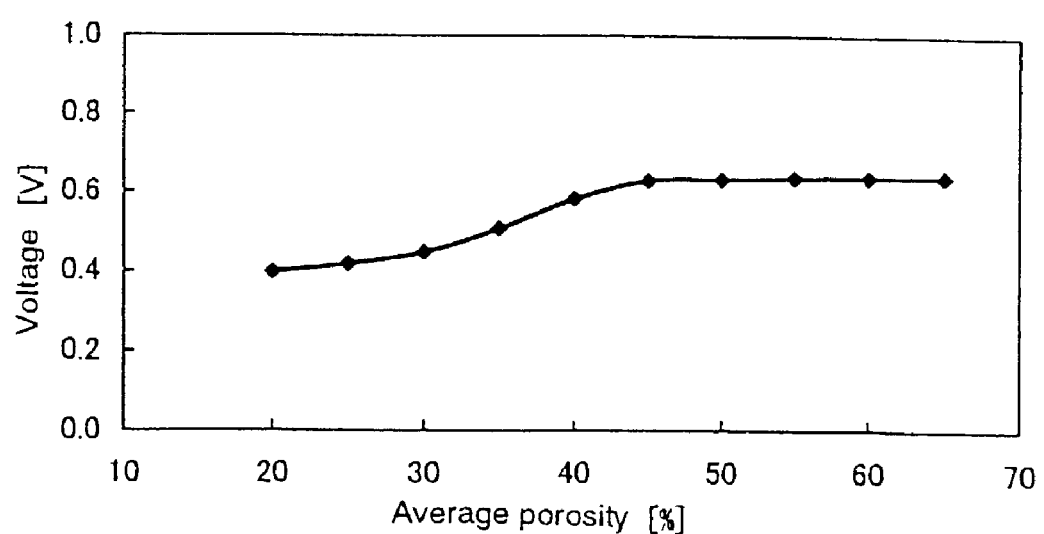
FIG. 11 is a graph showing the relationship between the average porosity of the diffusion layers and the produced voltage.

A slurry layer comprising carbon black and polytetrafluoroethylene was formed on several types of carbon paper having different average porosities. Then, slits were made therein so as to conform to the shape of the groove, and filled with silicone rubber. Electricity generation tests were carried out by using the gas diffusion layers so formed. The relationship between the average porosity of the diffusion layers and the produced voltage was examined, and the results thus obtained are shown in FIG. 11. The produced voltage began to drop when the average porosity was decreased to 40% or less. A voltage drop of about 20% was observed at an average porosity of 35%, and a voltage drop of 35% at an average porosity of 20%. These results indicate that the average porosity of the diffusion layers should be not less than 40% and preferably not less than 45%.

The separators used in these tests had a groove width of 1.0 mm, a rib width of 1.0 mm, and a groove depth of 0.3 mm. These dimensions should be determined on the basis of the balance between electrochemical performance and mechanical strength conditions for supporting the electrodes, and may be chosen in the ranges shown in Table 1 below, according to the intended purpose. As can be seen from Table 1, it is desirable that the groove width is in the range of 0.5 to 2.5 mm, the rib width is in the range of 0.5 to 2.5 mm, and the groove depth is in the range of 0.2 to 3.0 mm.

TABLE 1

Shape of Groove and Electricity Generation Performance

| Run | Electrode area [cm$^2$] | Current density [A/cm$^2$] | Groove width [m] | Rib width [m] | Depth [m] | Length [m] | Longitudinal electrode length [m] | Pressure loss [mmAq] | Electricity generation performance |
|---|---|---|---|---|---|---|---|---|---|
| 1 | 1600 | 1 | 5.0E−04 | 2.5E−03 | 3 | 2.0E+00 | 0.4 | 802 | Good |
| 2 | 1600 | 0.5 | 5.0E−04 | 2.5E−03 | 3 | 2.8E+00 | 0.4 | 786 | Good |
| 3 | 1600 | 1 | 2.5E−03 | 2.5E−03 | 1 | 1.2E+00 | 0.4 | 452 | Good |
| 4 | 1600 | 0.2 | 5.0E−04 | 2.5E−03 | 1 | 2.0E+00 | 0.4 | 692 | Good |
| 5 | 1600 | 1 | 2.5E−03 | 2.5E−03 | 0.2 | 4.0E−01 | 0.4 | 5018 | Good |
| 6 | 1600 | 0.2 | 5.0E−04 | 5.0E−04 | 0.2 | 4.0E−01 | 0.4 | 337 | Good |
| 7 | 300 | 1 | 5.0E−04 | 2.5E−03 | 3 | 1.6E+00 | 0.17 | 487 | Good |
| 8 | 300 | 1 | 2.5E−03 | 2.5E−03 | 1 | 8.7E−01 | 0.17 | 236 | Good |
| 9 | 300 | 0.2 | 5.0E−04 | 2.5E−03 | 1 | 1.6E+00 | 0.17 | 421 | Good |
| 10 | 300 | 1 | 5.0E−04 | 5.0E−04 | 0.2 | 1.7E−01 | 0.17 | 316 | Good |
| 11 | 300 | 0.2 | 5.0E−04 | 5.0E−04 | 0.2 | 1.7E−01 | 0.17 | 63 | Good |
| 12 | 150 | 1 | 2.5E−03 | 2.5E−03 | 1 | 8.6E−01 | 0.12 | 231 | Good |
| 13 | 150 | 0.5 | 5.0E−04 | 2.5E−03 | 1 | 6.1E−01 | 0.12 | 162 | Good |
| 14 | 150 | 1 | 2.5E−03 | 2.5E−03 | 0.2 | 1.2E−01 | 0.12 | 470 | Good |
| 15 | 150 | 0.2 | 5.0E−04 | 5.0E−04 | 0.2 | 1.2E−01 | 0.12 | 32 | Good |
| 16 | 25 | 1 | 5.0E−04 | 2.5E−03 | 1 | 3.5E−01 | 0.05 | 106 | Good |
| 17 | 25 | 1 | 2.5E−03 | 2.5E−03 | 0.2 | 5.0E−02 | 0.05 | 78 | Good |
| 18 | 25 | 0.2 | 5.0E−04 | 5.0E−04 | 0.2 | 1.5E−01 | 0.05 | 47 | Good |

In Table 1, "Run" represents a test number (for example, Run 1 represents Test No. 1), and the size of the groove is such that the groove width is 0.5 mm, the rib width is 2.5 mm, and the length is 2.0 m.

It is to be understood that the present invention is not limited to the above-described embodiments, and it is intended to cover all such changes, modifications and equivalent arrangements as fall within the scope of the appended claims.

Exploitability in Industry

Thus, the present invention can provide polymer electrolyte fuel cells in which at least a part of each diffusion layer is provided with a gas barrier for preventing the permeation of gas in a direction parallel to the major surface thereof, so that the retention of water in the cell can be avoided, uniform electricity generation can be achieved over the whole surface of the cell, and water can be removed efficiently.

What is claimed is:

1. A polymer electrolyte fuel cell comprising a cell having a solid polymer film, separators disposed on both sides of said cell so as to interpose said cell therebetween, and diffusion layers disposed between said cell and the separators, wherein each diffusion layer has a substrate comprising an electrically conductive porous material and a slurry layer disposed on the substrate, wherein at least one gas-impervious gas barrier is present in at least one diffusion layer and the gas barrier prevents the permeation of gas in a direction parallel to the major surface of the diffusion layer.

2. A polymer electrolyte fuel cell as claimed in claim 1 wherein said gas barrier comprises a gas-impervious material layer formed by removing the material of the substrate from the part thereof intended for the formation of a gas barrier and filling the resulting vacant space with rubber or resin.

3. A polymer electrolyte fuel cell as claimed in claim 1 wherein said gas barrier comprises (i) a projecting part of each separator having a thickness greater than the thickness of the separator adjacent to the gas barrier, and (ii) a compressed layer formed by compressing a portion of said electrically conductive porous material opposite to the projecting part of the separator.

4. A polymer electrolyte fuel cell as claimed in claim 1 wherein said gas barrier comprises a resin-impregnated layer formed by infiltrating resin into the part of each separator which is intended for the formation of a gas barrier and thereby imparting gas tightness thereto.

5. A polymer electrolyte fuel cell as claimed in claim 1, wherein said substrate comprising an electrically conductive porous material is formed by subjecting carbon paper, carbon cloth or nonwoven carbon fabric to a water-repellent treatment with a fluororesin.

6. A polymer electrolyte fuel cell as claimed in claim 1, wherein the surface energy of said diffusion layers is in the range of $1 \times 10^{-3}$ to $5 \times 10^{-2}$ N/m.

7. A polymer electrolyte fuel cell as claimed in claim 1, wherein the flow rate, $L_A$ [1/min], of the fuel gas fed and the pressure loss, $\Delta P_A$ [MPa], satisfy the condition defined by $\Delta P_A \leq 0.02 \times L_A$, and the flow rate, $L_C$ [1/min], of the oxidant gas fed and the pressure loss, $\Delta P_C$ [MPa], satisfy the condition defined by $\Delta P_C \leq 0.01 \times L_C$.

8. A polymer electrolyte fuel cell as claimed in claim 1, wherein the gas permeability rate of said diffusion layers is not less than $1.5 \times 10^{-4}$ cm/s/Pa.

9. A polymer electrolyte fuel cell as claimed in claim 1, wherein the average porosity of said diffusion layers is not less than 45%.

10. The polymer electrolyte fuel cell as claimed in claim 1, wherein the polymer film is a film formed of perfluorosulfonic acid.

11. The polymer electrolyte fuel cell as claimed in claim 1, wherein a first reaction layer and a second reaction layer are present on opposite sides of the solid polymer film.

12. The polymer electrolyte fuel cell of claim 11, wherein the first reaction layer is a platinum catalyst layer and the second reaction layer is a platinum catalyst layer.

13. The polymer electrolyte fuel cell as claimed in claim 1, wherein the separator has a projecting part and the diffusion layer has a recessed part and the projecting part and the recessed part correspond in position.

14. The polymer electrolyte fuel cell as claimed in claim 1, wherein the diffusion layer comprises a resin-impregnated layer.

15. The polymer electrolyte fuel cell as claimed in claim 1, wherein the fuel cell has a fuel electrode side and an air electrode side.

16. A method comprising passing a fuel gas through the fuel electrode side and an oxygen-containing gas through the air electrode side of the polymer electrolyte fuel cell according to claim 15.

17. The method as claimed in claim 16, wherein the method is carried out to generate electricity.

18. The polymer electrolyte fuel cell as claimed in claim 1, wherein the gas barrier is present in each of the diffusion layers along a major portion of the length of the diffusion layer in the direction corresponding to a gas flow path through the polymer electrolyte fuel cell.

19. The polymer electrolyte fuel cell of claim 1, wherein at least one diffusion layer has a plurality of gas barriers, wherein the gas barriers are parallel to one another and parallel to the flow of a gas flow through the polymer electrolyte fuel cell.

* * * * *